United States Patent [19]
Frerich

[11] Patent Number: 4,759,279
[45] Date of Patent: Jul. 26, 1988

[54] ROUND BALER HAVING CHAMBER FORMED BY FIXED ROLLS AND EXPANSIBLE BELTS

[75] Inventor: Josef Frerich, Dietrichingen, Fed. Rep. of Germany

[73] Assignee: Deere & Company, Moline, Ill.

[21] Appl. No.: 21,842

[22] Filed: Mar. 4, 1987

[30] Foreign Application Priority Data

Mar. 5, 1986 [GB] United Kingdom ............... 8605467
Feb. 5, 1987 [GB] United Kingdom ............... 8702596

[51] Int. Cl.⁴ ........................... B30B 3/04; B30B 5/04
[52] U.S. Cl. ........................................ 100/89; 100/88
[58] Field of Search ................ 100/89, 86, 78, 88; 56/341

[56] References Cited

U.S. PATENT DOCUMENTS

| | | |
|---|---|---|
| 4,334,467 | 6/1982 | Nishibe et al. ............... 100/89 |
| 4,514,969 | 5/1985 | Moosbrucker et al. ......... 100/88 X |
| 4,566,379 | 1/1986 | Decoene et al. ............... 100/89 |

FOREIGN PATENT DOCUMENTS

| | | |
|---|---|---|
| 0120545 | 10/1984 | European Pat. Off. . |
| 2090560 | 7/1982 | United Kingdom . |
| 2128542 | 5/1984 | United Kingdom . |

Primary Examiner—Andrew M. Falik

[57] ABSTRACT

A machine for forming large cylindrical bales of hay with a soft core and dense outer layers has a baling chamber which is defined by an arcuate array of fixed-position rolls, and by belts which are movable outwardly to accommodate a bale as it grows in size. The baling chamber is fed from the underside of the machine through a throat between the belts and rolls. The belts are trained over a single belt take-up roll on a pivoted arm which is loaded by a piston and cylinder unit to maintain belt tension. The belt take-up roll is located well outside the baling chamber to reduce the likelihood of being fouled by crop.

8 Claims, 3 Drawing Sheets

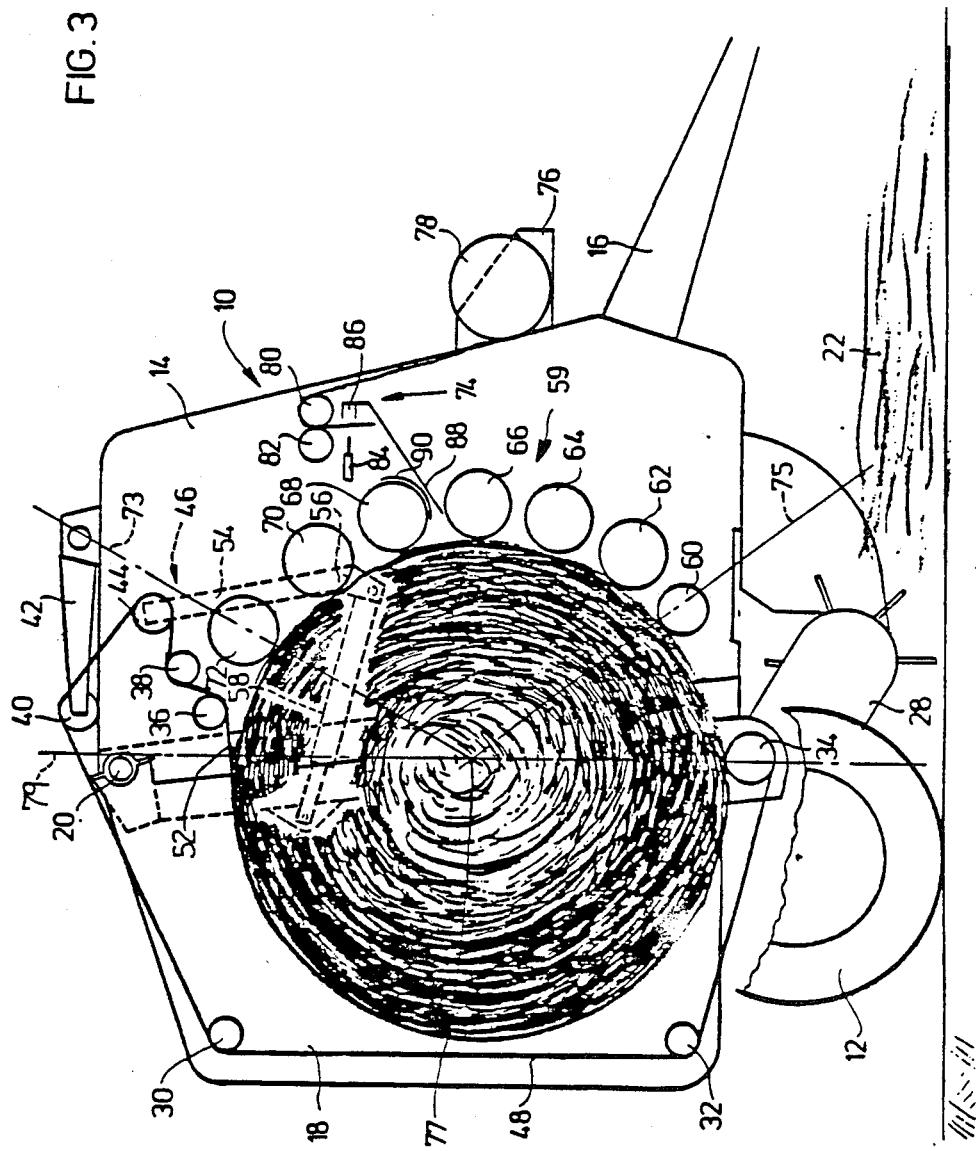

ROUND BALER HAVING CHAMBER FORMED BY FIXED ROLLS AND EXPANSIBLE BELTS

BACKGROUND OF THE INVENTION

The present invention relates to a baling machine for forming cylindrical bales of crop.

Machines, towed by a tractor, for forming large cylindrical bales of hay (so called "round balers") are well-known. As the machine advances, the crop is removed from a windrow by a pick-up mechanism and delivered rearwardly to a baling chamber where it is rolled into a bale.

There are basically two forms of such machines, namely those with a fixed volume baling chamber defined by driven fixed-position rolls and those with a baling chamber defined by runs of belts (driven by belt rolls over which they are entrained) which move outwardly to enlarge the chamber to accommodate the bale as it grows in size. In both forms the hay is caused by the driven movement of the rolls or belts to roll round upon itself into a core and the core rotates about its horizontal axis and finally an completed bale is formed, the chamber being fed throughout with hay. The completed bale is tied with twine to maintain its shape and is discharged through a gate formed by a rear portion of the machine. A machine with fixed-position rolls, i.e., with a constant volume baling chamber, will produce a bale with a "soft" core and dense outer layers while one with movable-position belts, i.e., with a variable volume baling chamber, will make a uniformly dense bale. The latter machine can be more compact in a lengthwise direction in that the baling chamber can in one design be fed from the underside rather than via a pick-up mounted on the front as is the case with the former machine.

Round balers having both rolls and belts have been proposed. One such machine, described GB-A-2 128 542, published May 2, 1984, has an upper forward part of the baling chamber defined by fixed-position driven rolls and the remaining lower and rearward part by a plurality of fixed-position belt conveyors. The baling chamber is thus of constant volume.

A machine of variable volume has been disclosed in GB-A-2 090 560, published July 14, 1982. Here the lower part of the baling chamber is defined by fixed-position rolls and the upper part by variable-position belt conveyors. The two machines have in common that they are fed via a pick-up located at the front.

Those machines of which the baling chamber is of constant volume clearly cannot be used to produce bales of different sizes as can the variable chamber balers. On the other hand, it is not simple in a variable volume chamber to wrap the bale with net or sheet material, rather than twine, as is now often favored.

SUMMARY OF THE INVENTION

According to the present invention there is provided a baling machine, which can produce soft core bales of different sizes in a variable volume chamber, and which is equipped very simply with apparatus for wrapping the bale with sheet or net and which is compact in the lengthwise direction.

An object of the present invention is to provide a baling machine for forming cylindrical bales of crop having a baling chamber having a rearward wall defined by driven belts and a forward wall defined by a plurality of chamber rolls, the belts being movable outwardly to accommodate a bale as it grows in size, and the belts and rolls being arranged so that the baling chamber can be fed with crop on its underside between the belts and the rolls. Desirably the rolls too are driven.

A more specific object is to provide a baler as set forth above wherein the belts are disposed so that at the start of baling they have respective runs cooperating to delimit a rearward wall of the baling chamber, which wall may extend vertically or upwardly and forwardly at an angle of up to forty degrees to the vertical, but preferably extends at an angle three to ten degrees from the vertical.

Yet another object is to provide a baler as set forth above wherein the plurality of chamber rolls ae preferably disposed in an arc subtending an angle in the range of sixty to 160 degrees at the center of the baling chamber when in its form for a full size bale, with a lowermost roll in the arc being desirably at an angle in the range of ten to fifty degrees to a vertical line through the center.

A further object of the invention is to provide a baler, as described above, which is provided with a belt tensioning mechanism having a single belt take-up roll only, instead of three rolls which are employed on a conventional machine with movable position belts, thus providing a saving in cost and complexity. Preferably, this single belt take-up roll is not a belt roll defining the baling chamber so the belt take-up roll has less tendency to be fouled by crop.

These and other objects, features and advantages of the present invention will become apparent to those skilled in the art from the description which follows and from the drawings.

BRIEF DESCRIPTION OF THE DRAWINGS

FIG. 3 shows the machine of FIG. 1 at the composition of baling.

DESCRIPTION OF THE PREFERRED EMBODIMENT

Figure 1:
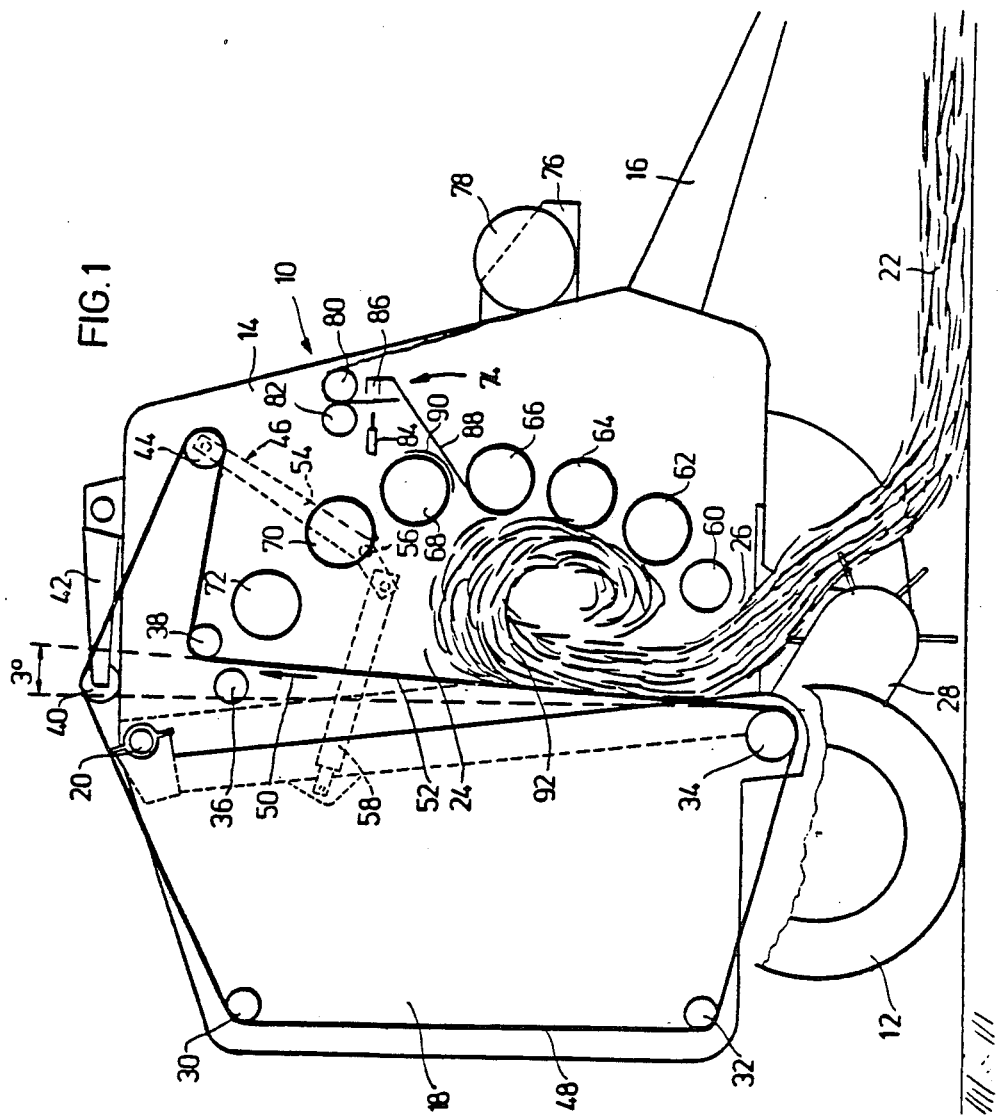
FIG. 1 is a somewhat schematic right side elevational view of a machine for forming large cylindrical bales of hay embodying a bale chamber constructed in accordance with the present invention and shown in its condition at the start of baling.

In the drawings, the baler includes a main frame 10 mounted on a pair of wheels of which only the right-hand wheel 12 is shown. The main frame has an upright fore-and-aft extending wall 14 on either side connected by transverse beams (not shown). A draft tongue 16 is connected to a transverse beam at the front of the frame 10 and extends forwardly for attaching the baler to a tractor (also not shown) which draws the machine. The rear half of the baler is in the form of a gate 18 swingable upwardly and rearwardly, from its position in FIG. 1 at the start of baling, about a gate shaft 20 at the top of the baler. Hay lying in a windrow 22 is fed to a baling chamber 24 through its lateral throat 26 at the middle portion of the underside of the machine by a pick-up 28 located below the machine. As described thus far the machine is conventional.

A plurality of lateral belt support rolls extend over the width of the machine. Of these, rolls 30, 32, 34 are mounted on the gate 18, rolls 36, 38 on the sidewalls 14, and roll 40 on a top arm 42, and a single roll 44 forms part of a belt take-up and tensioning mechanism 46. The roll 38 is connected to a drive (not shown).

Six rubber belts 48 are trained side-by-side over the rolls (with the initial exception of the roll 36) and move in an anticlockwise direction as indicated by arrow 50. Run 52 of the belts 48 between the rolls 34 and 38 (in FIG. 1) provides the rear wall of the baling chamber 24, and the run may be vertical but is preferably inclined upwardly and forwardly at an angle of from three to ten degrees and may be inclined as much as forty degrees to a vertical transverse plane passing tangent to the roll 34. Tension in the belts is maintained by the mechanism 46 which includes an upwardly extending idler arm 54 swingable about a pivot shaft 56 in its lower portion and pivotally connected at its lower end to the cylinder of a piston and cylinder unit 58 which in turn is pivotally connected at its piston end to the gate 18. An identical idler arm 54 and piston and cylinder unit 58 can be provided at the opposite side of the machine. The roll 44 is in that event mounted between the upper ends of the two idler arms 54. This roll 44 does not constitute a belt roll defining the baling chamber 24, but rather it is disposed well away from the chamber and is above it.

A forward wall of the baling chamber 24 is formed by a plurality of chamber rolls 60, 62, 64, 66, 68, 70 and 72 extending between and rotatably mounted in the sidewalls 14 in an arcuate array 59 arranged substantially cylindrically about a center 77 of the chamber 24, as considered when the chamber contains a completed bale, as shown in FIG. 3. The array 59 forms an arc which subtends an angle of 113 degrees between lines 73 and 75 extending from the chamber center 77 respectively through the center of the lowermost and uppermost rolls 60 and 72 of the array, but may be arranged to subtend angles in the range of sixty to 160 degrees. The lowermost roll 60 of the array 59 is shown at an angle of thirty-seven degrees to a vertical line 79 through the center 77 but may be arranged at angles in the range of ten to fifty degrees. The chamber rolls are all driven in the anticlockwise direction.

A net-wrapping apparatus 74 is disposed at the front of the baler. It has a support in the form of a trough 76, across the width of the front of the machine, which contains a roll 78 of net (or sheet) which passes upwardly initially and then over a forward roll of a pair of side-by-side feed rolls 80, 82 into the nip between the feed rolls. Thus, the net passes downwardly between a knife 84 and its associated abutment 86 to a guide plate 88 which leads the net between the fixed-position rolls 66, 68 the roll 68 having an arcuate shield 90 on its underside.

Figure 2:
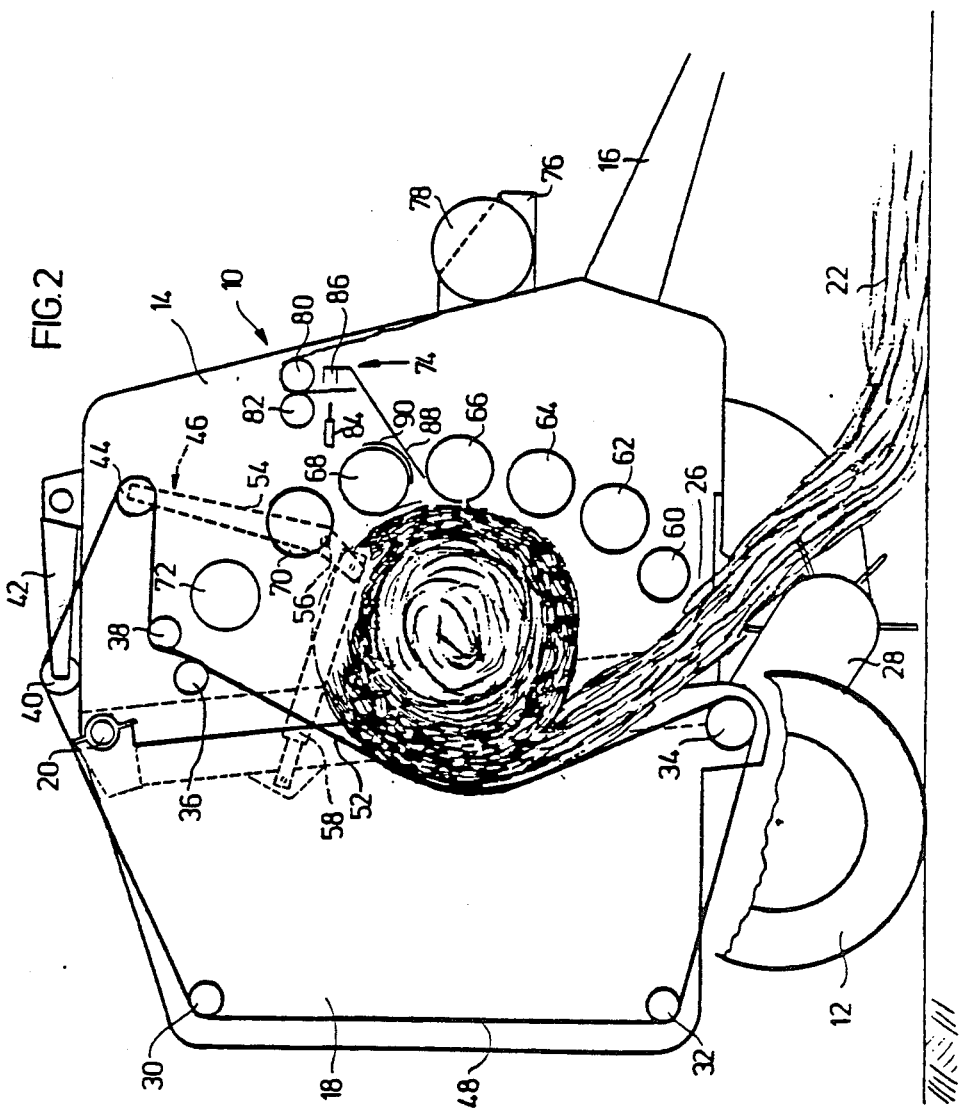
FIG. 2 shows the machine of FIG. 1 at an intermediate stage in bale formation.

In operation, when hay lying in the windrow 22 is conveyed to the baling chamber by the pick-up 28 through the throat 26 between the anticlockwise driven belts 48 and the anticlockwise driven array 59 of chamber rolls, the oppositely moving belt run 52 and the chamber rolls cause the crop to turn clockwise upon itself (as viewed in FIG. 1) so that it becomes wound up into a cylindrical soft bale core 92 of increasing size which eventually overcomes the tension in the belts thereupon causing the idler arm 54 to swing anticlockwise (FIG. 2) against the loading provided by the piston and cylinder unit 58, and the belts 48 contact the roll 36. The force needed to deflect the belt initially is relatively low due to the design of the tensioning mechanism 46, but increases as the bale enlarges. Thus, this assists the formation of a bale with a soft core. The bale continues to grow in size until the position of the idler arm 54 shown in FIG. 3 is reached. When the density of the outer layers of the bale is sufficiently high the pick-up 28 is stopped and the completed bale is wrapped with net, the tractor being stationary. The net is advanced by the feed rolls 80, 82 over the guide plate 88 and into the baling chamber 24. The bale at this time is still being turned by the belts 48 and the fixed-position rolls, and is caused to complete almost a further turn when the knife 84 is operated to sever the net, and the free end thereof finally passes into the chamber overlying the initial wrap of netting.

With the bale now secured by the net the drive to the belts 48 and fixed-position rolls is cut, the gate 18 is opened using the piston and cylinder units 58 on either side of the machine, and the bale is deposited on the ground. The gate 18 is closed and the tractor then resumes its course along the windrow with the pick-up 28 once more in operation.

I claim:

1. In a baling machine for making large cylindrical bales and including a baling chamber having a non-expansible forward wall delimited in its entirety by a plurality of chamber rolls rotatably mounted in opposite sidewalls of the machine and an expansible rearward wall delimited in its entirety by a run of an endless flexible element means supported by rotatable support elements mounted to the opposite sidewalls and a take-up and tensioning device for the endless flexible element including a pair of parallel arms respectively vertically pivotally mounted to the opposite sidewalls and carrying take-up roll means engaged with the flexible element and a pair of yieldable arm loading means respectively coupled between the opposite sidewalls and the pair of parallel arms, the improvment comprising: said chamber having a center which substantially coincides with that of a completed bale located in the chamber; said chamber rolls being arranged in an array disposed substantially arcuately about said center with a lowermost chamber roll being located substantially vertically below an uppermost chamber roll; said endless flexible element means including a plurality of side-by-side mounted belts and said rotatable support elements including upper and lower support rolls extending between and being rotatably mounted in the opposite sidewalls; said run being those portions of the belts extending between the upper and lower support rolls with the upper roll being located adjacent the uppermost chamber roll and forwardly of a vertical transverse plane extending tangent to the lower support roll whereby the run is inclined upwardly and forwardly from the lower support roll; and said lower support roll being spaced rearwardly of the lowermost chamber roll thereby defining a crop-receiving throat therebetween.

2. The baling machine defined in claim 1 wherein said upper support roll is spaced forwardly from said plane a distance such that said run is inclined at an angle in the range from three to ten degrees to said plane.

3. The baling machine defined in claim 1 wherein said array of chamber rolls are disposed in an arc subtending an angle in the range of sixty to 160 degrees.

4. The baling machine defined in claim 3 in which the lowermost chamber roll of the array is at an angle in the range of ten to fifty degrees to a vertical, transverse plane passing through the center of the chamber.

5. The baling machine defined in claim 1 wherein said take-up means includes only one take-up roll extending between the rotatably mounted in the pair of parallel arms with the arms being located so as to dispose the take-up roll forwardly and above the uppermost chamber roll.

6. The baling machine defined in claim 5 wherein said take-up roll is located above the pivotal mounting of the pair of arms to the opposite sidewalls.

7. The bailing machine defined by claim 1 wherein the baling machine includes a vertically swingable gate selectively swingable to an open position permitting discharge of a completed bale from the chamber; and said arm loading means including a pair of hydraulic actuators respectively connected between the pair of arms and the gate.

8. The baling machine defined in claim 1 and further including a net-wrapping apparatus located at a forward location of the machine ahead of the array of chamber rolls and including a net feed and directing means for feeding and directing the net between a pair of said chamber rolls.

* * * * *

UNITED STATES PATENT AND TRADEMARK OFFICE
CERTIFICATE OF CORRECTION

PATENT NO. : 4,759,279
DATED : 26 July 1988
INVENTOR(S) : Josef Frerich

It is certified that error appears in the above-identified patent and that said Letters Patent is hereby corrected as shown below:

Claim 5, line 3, change "the" (first occurrence) to -- and --.

Signed and Sealed this

Seventh Day of May, 1991

Attest:

HARRY F. MANBECK, JR.

*Attesting Officer*      *Commissioner of Patents and Trademarks*